United States Patent
Liu et al.

(10) Patent No.: US 12,506,392 B2
(45) Date of Patent: Dec. 23, 2025

(54) VIBRATION MOTOR WITH DAMPING GLUE BETWEEN ELASTIC ARMS AND METAL PLATES IN VIBERATOR

(71) Applicant: AAC Microtech (Changzhou) Co., Ltd., Jiangsu (CN)

(72) Inventors: Jie Liu, Changzhou (CN); Junsheng Wang, Changzhou (CN); Jie Wu, Changzhou (CN); Aijie Zhu, Changzhou (CN); Zixu Hua, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 306 days.

(21) Appl. No.: 18/320,174

(22) Filed: May 18, 2023

(65) Prior Publication Data

US 2024/0178734 A1    May 30, 2024

Related U.S. Application Data

(63) Continuation of application No. PCT/CN2023/084842, filed on Mar. 29, 2023.

(30) Foreign Application Priority Data

Nov. 30, 2022   (CN) .......................... 202223200843.5

(51) Int. Cl.
    *H02K 33/02*      (2006.01)
(52) U.S. Cl.
    CPC .................................. *H02K 33/02* (2013.01)

(58) Field of Classification Search
    CPC ....... H02J 1/00; H02K 11/046; H02K 7/1869; H02K 7/1876; H02K 41/02; H02K 33/00; H02N 11/00; H02N 11/002
    USPC .. 310/12, 12.12, 12.01, 12.03, 12.13, 12.16, 310/12.211, 2.24, 12.26, 25, 15
    See application file for complete search history.

(56) References Cited

U.S. PATENT DOCUMENTS

| | | | | |
|---|---|---|---|---|
| 5,973,422 | A * | 10/1999 | Clamme | H02K 33/16 310/90.5 |
| 7,586,220 | B2 * | 9/2009 | Roberts | H02K 1/34 290/1 R |
| 7,791,456 | B2 * | 9/2010 | Miura | H02K 33/16 340/407.1 |
| 7,948,124 | B1 * | 5/2011 | Waters | H02K 35/00 310/36 |

(Continued)

*Primary Examiner* — Maged M Almawri
(74) *Attorney, Agent, or Firm* — Wiersch Law Group

(57) ABSTRACT

A vibration motor, including a housing with a receiving space, a stator assembly fixed in the housing, a vibrator assembly received in the housing and driven by the stator assembly to vibrate, and a leaf spring connecting the housing and the vibrator assembly. The leaf spring includes an outer fixed portion fixed to the housing, an inner fixed portion fixed to the vibrator assembly, and an elastic arm connecting the outer fixed portion and the inner fixed portion. The elastic arm extends from the inner fixed portion to the outer fixed portion in a manner of rotating around the inner fixed portion. The vibration motor further includes damping glue arranged between two adjacent elastic arms for adjusting vibration damping of the vibrator assembly. The vibration motor of the present disclosure reduces material costs and improves reliability and consistency of a product.

5 Claims, 4 Drawing Sheets

(56) References Cited

U.S. PATENT DOCUMENTS

| | | | | |
|---|---|---|---|---|
| 8,456,032 B2* | 6/2013 | Hochberg | ............... | F03B 13/00 290/43 |
| 8,492,937 B2* | 7/2013 | Roberts | .................. | H02K 35/00 310/32 |
| 8,593,017 B2* | 11/2013 | Stefanini | ................ | H02K 35/02 290/1 R |
| 8,629,569 B2* | 1/2014 | Roberts | .................. | H02K 35/02 290/1 R |
| 9,461,530 B2* | 10/2016 | Wasenczuk | ............ | H02K 35/02 |
| 10,170,969 B2* | 1/2019 | Ohishi | ................. | H02K 7/1876 |
| 10,622,538 B2* | 4/2020 | Zhang | ................ | H10N 30/802 |
| 10,811,949 B2* | 10/2020 | Oonishi | .................... | H02J 7/34 |
| 11,031,857 B2* | 6/2021 | Wasenczuk | ............ | H02N 2/186 |
| 11,152,843 B2* | 10/2021 | Wasenczuk | ............. | H02K 1/34 |
| 11,418,099 B2* | 8/2022 | Takahashi | .............. | H02K 33/16 |
| 11,848,586 B2* | 12/2023 | Takahashi | .............. | H02K 33/06 |
| 12,003,156 B2* | 6/2024 | Takahashi | .............. | H02K 33/06 |
| 2008/0265692 A1* | 10/2008 | Roberts | ................... | H02K 1/34 310/15 |
| 2010/0066182 A1* | 3/2010 | Yamazaki | ............... | B06B 1/045 310/29 |
| 2010/0327672 A1* | 12/2010 | Roberts | .................. | H02K 35/00 310/25 |
| 2011/0260559 A1* | 10/2011 | Kanai | ....................... | B06B 1/16 310/25 |
| 2012/0212097 A1* | 8/2012 | Wasenczuk | ............... | B06B 1/04 310/216.001 |
| 2013/0285479 A1* | 10/2013 | Kinoshita | ............... | H02K 35/02 310/12.12 |
| 2013/0342032 A1* | 12/2013 | Laurent | ................... | H02K 35/04 310/306 |
| 2017/0366077 A1* | 12/2017 | Oonishi | .................. | H02J 50/00 |
| 2019/0207496 A1* | 7/2019 | Takahashi | .............. | H02K 33/02 |
| 2020/0274432 A1* | 8/2020 | Wauke | .................. | H02K 33/06 |
| 2021/0028679 A1* | 1/2021 | Wasenczuk | ............. | H02K 1/34 |
| 2021/0328491 A1* | 10/2021 | Takahashi | .............. | H02K 33/06 |
| 2022/0085709 A1* | 3/2022 | Oonishi | .................. | B06B 1/045 |
| 2023/0074890 A1* | 3/2023 | Muniraju | ............. | H02N 11/002 |

* cited by examiner

VIBRATION MOTOR WITH DAMPING GLUE BETWEEN ELASTIC ARMS AND METAL PLATES IN VIBERATOR

TECHNICAL FIELD

The present disclosure relates to the field of motors, and in particular, to a vibration motor.

BACKGROUND

A vibration motor in the related art includes a housing having a receiving space, a stator assembly fixed in the housing, a vibrator assembly received in the housing and driven by the stator assembly to vibrate, a leaf spring connecting the housing and the vibrator assembly, and magnetic liquid arranged between the stator assembly and the vibrator assembly for adjusting vibration damping of the vibrator assembly. However, material costs of the magnetic liquid are high. In addition, a position of the magnetic liquid is affected by a magnetic field and cannot be effectively controlled, thus the product has poor reliability and consistency.

Therefore, there is a need to provide a new vibration motor to solve the above technical problems.

SUMMARY

In an aspect, the present disclosure provides a vibration motor, including a housing having a receiving space, a stator assembly fixed in the housing, a vibrator assembly received in the housing and driven by the stator assembly to vibrate, and at least one leaf spring connecting the housing and the vibrator assembly. Each of the at least one leaf spring includes an outer fixed portion fixed to the housing, an inner fixed portion fixed to the vibrator assembly, and at least two elastic arms connecting the outer fixed portion and the inner fixed portion, the at least two elastic arms extend from the inner fixed portion to the outer fixed portion in a manner of rotating around the inner fixed portion. The vibration motor further includes damping glue arranged between two adjacent elastic arms of the at least two elastic arms for adjusting vibration damping of the vibrator assembly.

As an improvement, the at least two elastic arms include three elastic arms, and the three elastic arms are distributed at an angle of 120° around the inner fixed portion.

As an improvement, the at least one spring leaf spring includes two leaf springs, which are a first leaf spring connecting the housing and a side end portion of the vibrator assembly and a second leaf spring connecting the housing and another side end portion of the vibrator assembly, and a rotating direction of each of the at least two elastic arms of the first leaf spring is opposite to a rotating direction of each of the at least two elastic arms of the second leaf spring.

As an improvement, each of the at least one leaf spring is formed by stamping a one-piece stainless steel sheet.

As an improvement, the vibrator assembly includes a bracket, a coil wound around the bracket, and a weight fixed to the bracket. A metal member is embedded in the bracket, the metal member includes a first metal plate, a second metal plate arranged parallel to and apart from the first metal plate, and a metal post connecting the first metal plate and the second metal plate. The metal post is perpendicular to the first metal plate and extends along a vibrating direction of the vibrator assembly. The coil sleeves the metal post and is located between the first metal plate and the second metal plate.

As an improvement, the stator assembly includes a pole core fixed to the housing and a magnet fixed to a surface of the pole core close to the vibrator assembly, and the magnet is arranged opposite to and apart from the coil.

BRIEF DESCRIPTION OF DRAWINGS

In order to better illustrate the technical solutions in the embodiments of the present disclosure, the accompanying drawings used in the description of the embodiments will be briefly introduced below. It is apparent that, the accompanying drawings in the following description are merely some embodiments of the present disclosure, and other drawings can be obtained by those of ordinary skill in the art from the provided drawings without creative efforts.

DESCRIPTION OF EMBODIMENTS

The technical solutions in the embodiments of the present disclosure will be described below with reference to the accompanying drawings in the embodiments of the present disclosure. It should be noted that, the described embodiments are merely a part of instead of all of the embodiments of the present disclosure. Based on the embodiments in the present disclosure, all other embodiments obtained by those of ordinary skill in the art without creative efforts shall fall within a scope of the present disclosure.

Figure 1:
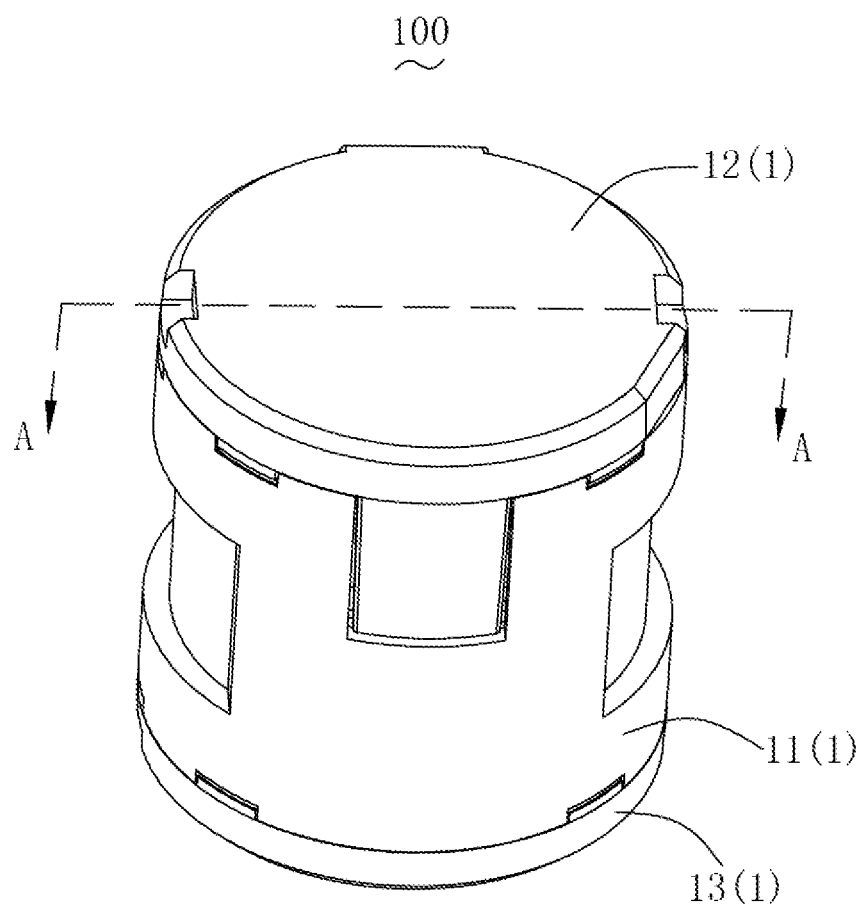
FIG. 1 is a three-dimensional view of a vibration motor according to the present disclosure.
Figure 2:
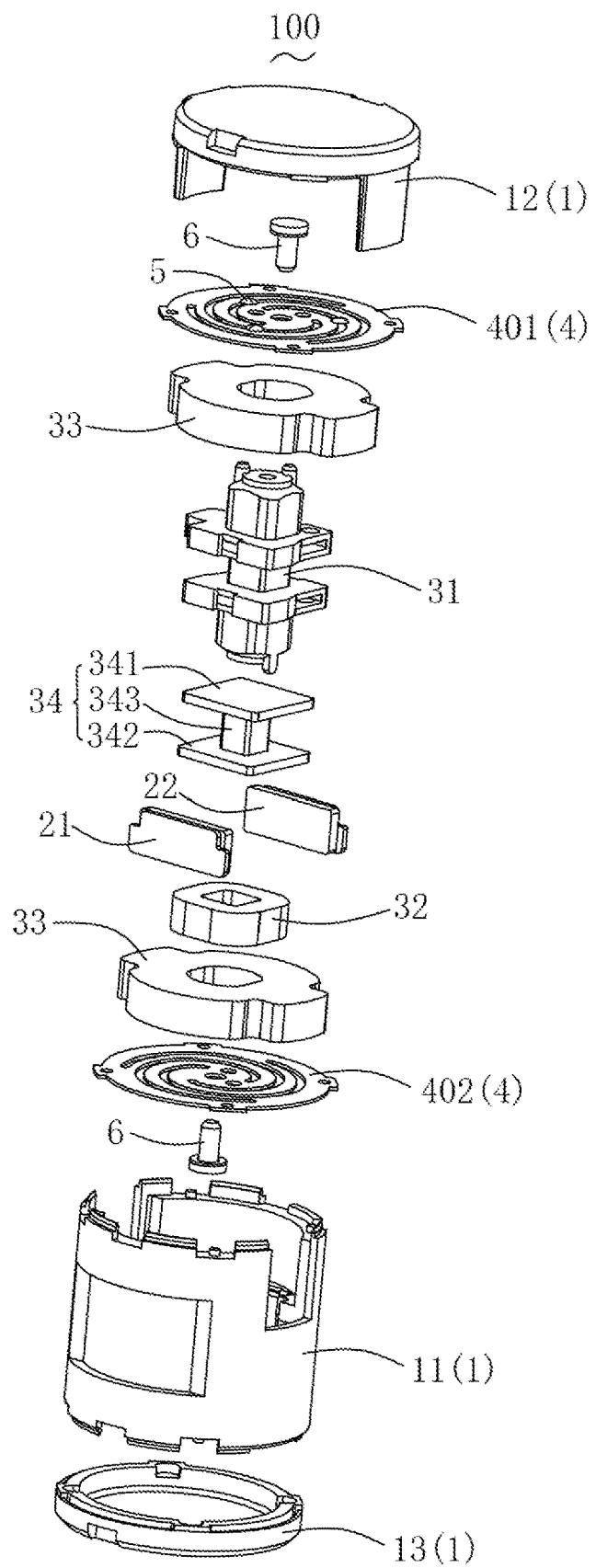
FIG. 2 is a three-dimensional exploded view of the vibration motor shown in FIG. 1.
Figure 3:
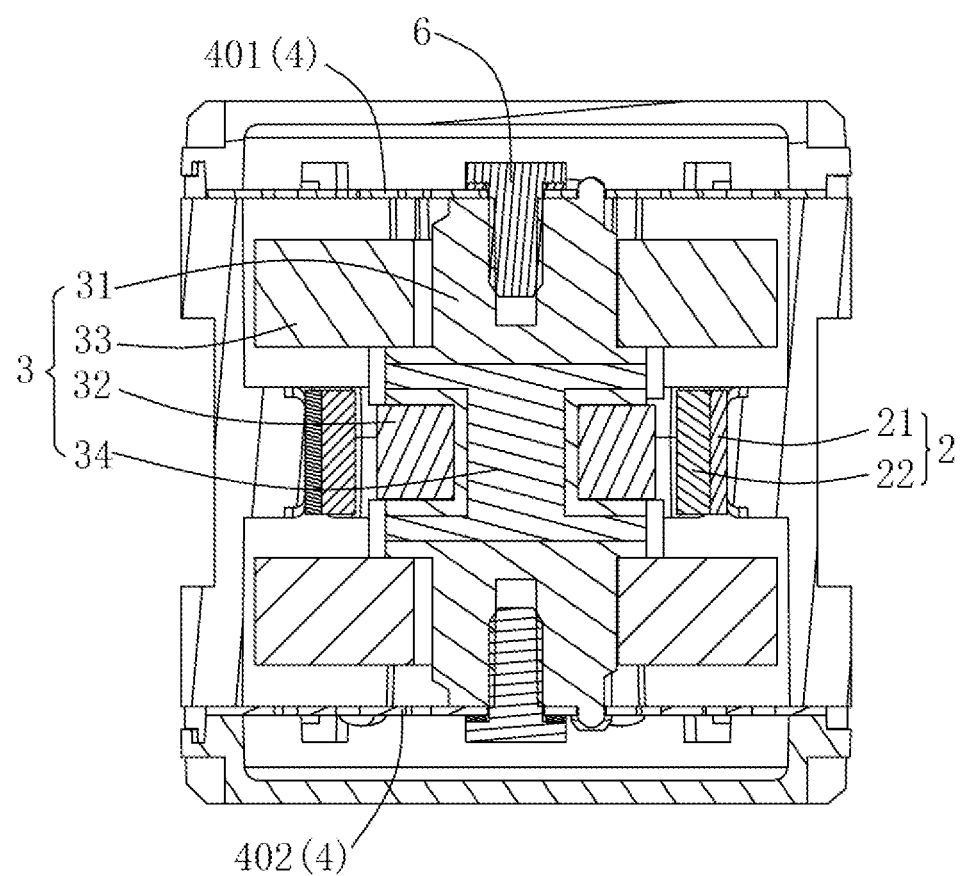
FIG. 3 is a sectional view taken along A-A in FIG. 1.
Figure 4:
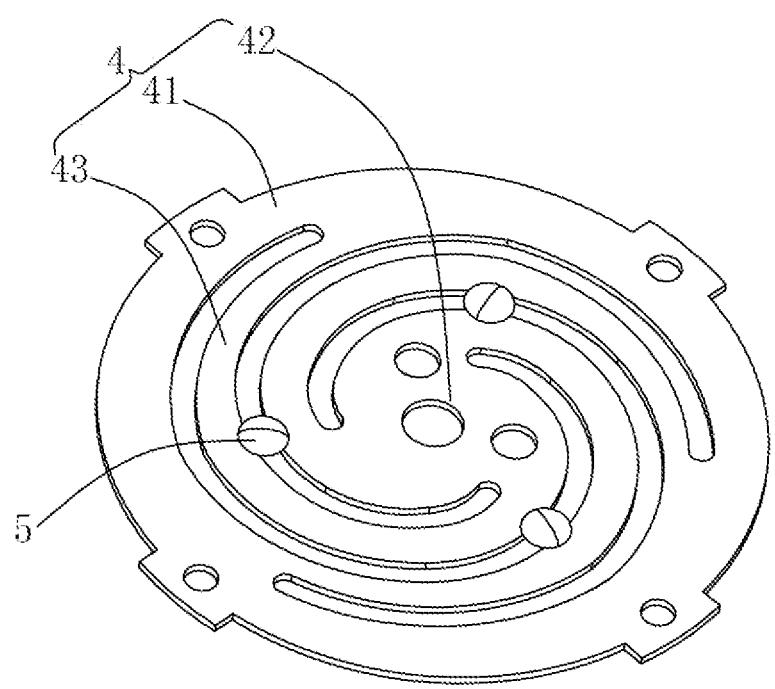
FIG. 4 is a combined diagram of a leaf spring and damping glue of the vibration motor shown in FIG. 1.

Referring to FIG. 1 to FIG. 4, the present disclosure provides a vibration motor 100. The vibration motor 100 includes a housing 1 having a receiving space, a stator assembly 2 fixed in the housing 1, a vibrator assembly 3 received in the housing 1 and driven by the stator assembly 2 to vibrate, and a leaf spring 4 connecting the housing 1 and the vibrator assembly 3.

The leaf spring 4 includes an outer fixed portion 41 fixed to the housing 1, an inner fixed portion 42 fixed to the vibrator assembly 3, and an elastic arm 43 connecting the outer fixed portion 41 and the inner fixed portion 42. The elastic arm 43 extends from the inner fixed portion 42 to the outer fixed portion 41 in a manner of rotating around the inner fixed portion 42.

The vibration motor 100 further includes damping glue 5 arranged between two adjacent elastic arms 43 for adjusting vibration damping of the vibrator assembly 3.

In an embodiment, three elastic arms 43 are provided, and the three elastic arms 43 are distributed at an angle 120° around the inner fixed portion 42.

The housing 1 includes a frame 11, an upper cover 12 covering an upper end of the frame 11, and a lower cover 13 covering a lower end of the frame 11.

In an embodiment, two leaf springs 4 are provided. The two leaf springs 4 are a first leaf spring 401 connecting the housing 1 and a side end portion of the vibrator assembly 3 close to the upper cover 12, and a second leaf spring 402 connecting the housing 1 and another side end portion of the vibrator assembly 3 close to the lower cover 13. The outer fixed portion 41 of the first leaf spring 401 is fixed between the upper cover 12 and the frame 11, and the outer fixed portion 41 of the second leaf spring 402 is fixed between the lower cover 13 and the frame 11.

In an example, a rotating direction of the elastic arm 43 of the first leaf spring 401 is opposite to a rotating direction of the elastic arm 43 of the second leaf spring 402, so that vibration balance of the vibrator assembly 3 can be maintained.

The leaf spring 4 is formed by stamping a one-piece stainless steel sheet.

The vibrator assembly 3 includes a bracket 31, a coil 32 wound around the bracket 31, and a weight 33 fixed to the bracket 31. A metal member 34 is embedded in the bracket 31. The metal member 34 includes a first metal plate 341, a second metal plate 342 arranged parallel to and apart from the first metal plate 341, and a metal post 343 connecting the first metal plate 341 and the second metal plate 342. The metal post 343 is perpendicular to the first metal plate 341 and extends along a vibrating direction of the vibrator assembly 3. The coil 32 sleeves the metal post 343 and is located between the first metal plate 341 and the second metal plate 342. The inner fixed portions 42 of the first leaf spring 401 and the second leaf spring 402 are respectively fixed to the bracket 31 through bolts 6.

The stator assembly 2 includes a pole core 21 fixed to the frame 11 and a magnet 22 fixed to a surface of the pole core 21 close to the vibrator assembly 3, and the magnet 22 is arranged opposite to and apart from the coil 32.

According to the vibration motor of the present disclosure, damping glue is provided between two adjacent elastic arms, and when the vibrator assembly vibrates, there is a displacement difference between the two adjacent elastic arms, thereby stretching and compressing the damping glue therebetween, and thus adjusting the vibration damping of the vibrator assembly. The use of the damping glue instead of the magnetic liquid reduces the material costs and improves reliability and consistency of the product.

The above descriptions are merely some embodiments of the present disclosure. It should be pointed out herein that, for those of ordinary skill in the art, improvements can also be made without departing from the creative concept of the present disclosure, all of which shall fall within a scope of the present disclosure.

What is claimed is:

1. A vibration motor, comprising a housing having a receiving space, a stator assembly fixed in the housing, a vibrator assembly received in the housing and driven by the stator assembly to vibrate, and at least one leaf spring connecting the housing and the vibrator assembly, wherein each of the at least one leaf spring comprises an outer fixed portion fixed to the housing, an inner fixed portion fixed to the vibrator assembly, and at least two elastic arms connecting the outer fixed portion and the inner fixed portion, the at least two elastic arms extend from the inner fixed portion to the outer fixed portion in a manner of rotating around the inner fixed portion, wherein the vibration motor further comprises damping glue arranged between two adjacent elastic arms of the at least two elastic arms for adjusting vibration damping of the vibrator assembly, wherein the vibrator assembly comprises a bracket, a coil wound around the bracket, and a weight fixed to the bracket, wherein a metal member is embedded in the bracket, the metal member comprises a first metal plate, a second metal plate arranged parallel to and apart from the first metal plate, and a metal post connecting the first metal plate and the second metal plate, wherein the metal post is perpendicular to the first metal plate and extends along a vibrating direction of the vibrator assembly; and wherein the coil sleeves the metal post and is located between the first metal plate and the second metal plate.

2. The vibration motor as described in claim 1, wherein the at least two elastic arms comprise three elastic arms, and the three elastic arms are distributed at an angle of 120° around the inner fixed portion.

3. The vibration motor as described in claim 1, wherein the at least one spring leaf spring comprises two leaf springs, which are a first leaf spring connecting the housing and a side end portion of the vibrator assembly and a second leaf spring connecting the housing and another side end portion of the vibrator assembly, and a rotating direction of each of the at least two elastic arms of the first leaf spring is opposite to a rotating direction of each of the at least two elastic arms of the second leaf spring.

4. The vibration motor as described in claim 1, wherein each of the at least one leaf spring is formed by stamping a one-piece stainless steel sheet.

5. The vibration motor as described in claim 1, wherein the stator assembly comprises a pole core fixed to the housing and a magnet fixed to a surface of the pole core close to the vibrator assembly, and the magnet is arranged opposite to and apart from the coil.

\* \* \* \* \*